United States Patent [19]

Schockley et al.

[11] Patent Number: 5,173,681
[45] Date of Patent: Dec. 22, 1992

[54] SPEED SENSITIVE VISUAL WARNING SYSTEM FOR LOCOMOTIVES

[75] Inventors: James F. Schockley; Mark E. Kane, both of Orange Park, Fla.

[73] Assignee: Quantum Engineering, Inc., Jacksonville, Fla.

[21] Appl. No.: 584,357

[22] Filed: Sep. 18, 1990

[51] Int. Cl.$^5$ .............................................. B60Q 1/00
[52] U.S. Cl. ..................................... 340/441; 340/936; 340/463; 340/467; 340/326
[58] Field of Search ............... 340/441, 936, 463, 466, 340/467, 326, 384 R; 73/181, 182; 246/217, 473 R, 473.3, 473.1

[56] References Cited

U.S. PATENT DOCUMENTS 4,213,115  7/1980  Wetzel ................................. 340/404
4,371,864  2/1983  Kawasaki ........................... 340/441

FOREIGN PATENT DOCUMENTS 967263  5/1975  Canada ................................. 340/441

Primary Examiner—Jin F. Ng
Assistant Examiner—Christine K. Oda
Attorney, Agent, or Firm—Arthur G. Yeager

[57] ABSTRACT

A visual warning system for a locomotive includes a light signal unit mounted on the body of a locomotive which is connected to a control module which provides for both manual and automatic energization of the lights. In the automatic mode, the lights are enabled at or above a predetermined speed and disabled when the locomotive is below the given speed. The light energization works in conjunction with other warning systems, particularly a locomotive horn.

21 Claims, 1 Drawing Sheet

SPEED SENSITIVE VISUAL WARNING SYSTEM FOR LOCOMOTIVES

BACKGROUND OF THE INVENTION

1. Field Of The Invention

The present invention relates to visual warning systems for use with locomotives and particularly to parameter-sensitive controls for the visual warning systems used.

2. Prior Art

U.S. Pat. No. 4,213,115 and others teach the art of visual warning systems for use on locomotives to warn pedestrians and vehicular traffic at highway grade crossings of the approach of a moving train. In each of these prior systems, a light is actuated whenever the engineer takes some action which is associated with the approach to the crossing, e.g., blowing the horn or ringing the bell.

The contemporary use of high intensity strobe lights, or "ditch lights", for illuminating and/or warning the approach area of a highway/rail crossing has a detrimental effect on the normal operation of the locomotive in slow-speed switching moves. The same actions taken by the locomotive engineer to warn motorists of the approach of the train are frequently performed while the locomotive is stopping, starting, and changing directions of movement. The visual warning lights of such prior art systems are thus actuated during these conditions. Each of these activities are performed while the engineer has a crew member on the ground to throw switches, guide the movement of the locomotive, or re-board the locomotive while it is accelerating. Unfortunately, the high intensity light may create a safety hazard through an unintended ability to blind and/or mesmerize the crew-member, who is standing in the exact centroid of the light beam.

Also, the effective use of the visual warning system may be nullified if a means for disabling the lights is provided which could inadvertently be left disengaged by the locomotive engineer. This could happen if a simple manual on/off switch were provided, for example, and would not be an effective fail safe way of alleviating the problem.

SUMMARY OF THE INVENTION

In one aspect of the present invention there is provided a visual warning system for a locomotive having a selectively operable audible warning device including a control module adapted for mounting to a locomotive for selective operation of signal lamps which includes at least one signal lamp electrically connected to the control module and selectively operable ON. Monitoring means, such as a means that determines the speed of a locomotive, provides a first output signal representative thereof. The control module includes first circuit means responsive to operation of the audible warning device for providing a second output signal when the warning device is being operated ON and second circuit means responsive to the first and second output signals for selectively operating the lamp ON.

Other aspects of the invention include a manually operable switch means for selective operation of the lamp ON by operation of the switch at any locomotive speed. The second circuit means is responsive to the first output signal to prevent the lamp from being operated ON when locomotive speed is below a predetermined speed as established by the second circuit means. The second circuit means includes logic circuit means for operating the lamp ON when the second output signal is being provided to the second circuit means representing that the audible warning device is being operated ON and the speed of a locomotive is above a predetermined speed as determined by the second circuit means. In addition, the second circuit means includes logic circuit means for preventing the operation of the lamp ON in response to the first output signal except when the audible warning device is ON. The speed monitoring means includes a tachometer means responsive to locomotive speed which includes a locomotive radar or axle alternator type tachometer providing a variable frequency output signal. The control module includes third circuit means for maintaining the signal light ON for a predetermined time period as established by the third circuit means after the signal light has been operated ON by the control module and operating the signal light OFF after that time period. The audible warning device includes an air pressure-operated horn and the first circuit means including a pressure switch for providing the second output signal which is actuatable by air pressure to the horn when the warning device is selectively operated ON. The horn may be electrically operated and the first circuit means would include sensing circuit means connected to the electric actuator for providing the second output signal when the horn has been selectively operated ON by the actuator. The signal light is preferably a stroboscopic lamp and the signal control unit includes strobe control circuit means for energizing the stroboscopic lamp ON and flashing the stroboscopic lamp ON a predetermined number of times as established by the third circuit means.

The present invention includes a visual warning system employing a control module that contains (1) the locomotive speed monitoring means such as a tachometer; (2) circuit means that provide an output in response to actuation of the audible warning system of the locomotive; (3) a manually-operated input circuit that includes a manual switch and signal processing circuitry; and (4) a strobe control unit that operates the warning lights of the locomotive. The control module also contains circuit means by which the various parts of the system, as mentioned above, are interfaced as understood in the art.

BRIEF DESCRIPTION OF THE DRAWINGS

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE PREFERRED EMBODIMENT

Figures 1, 2:
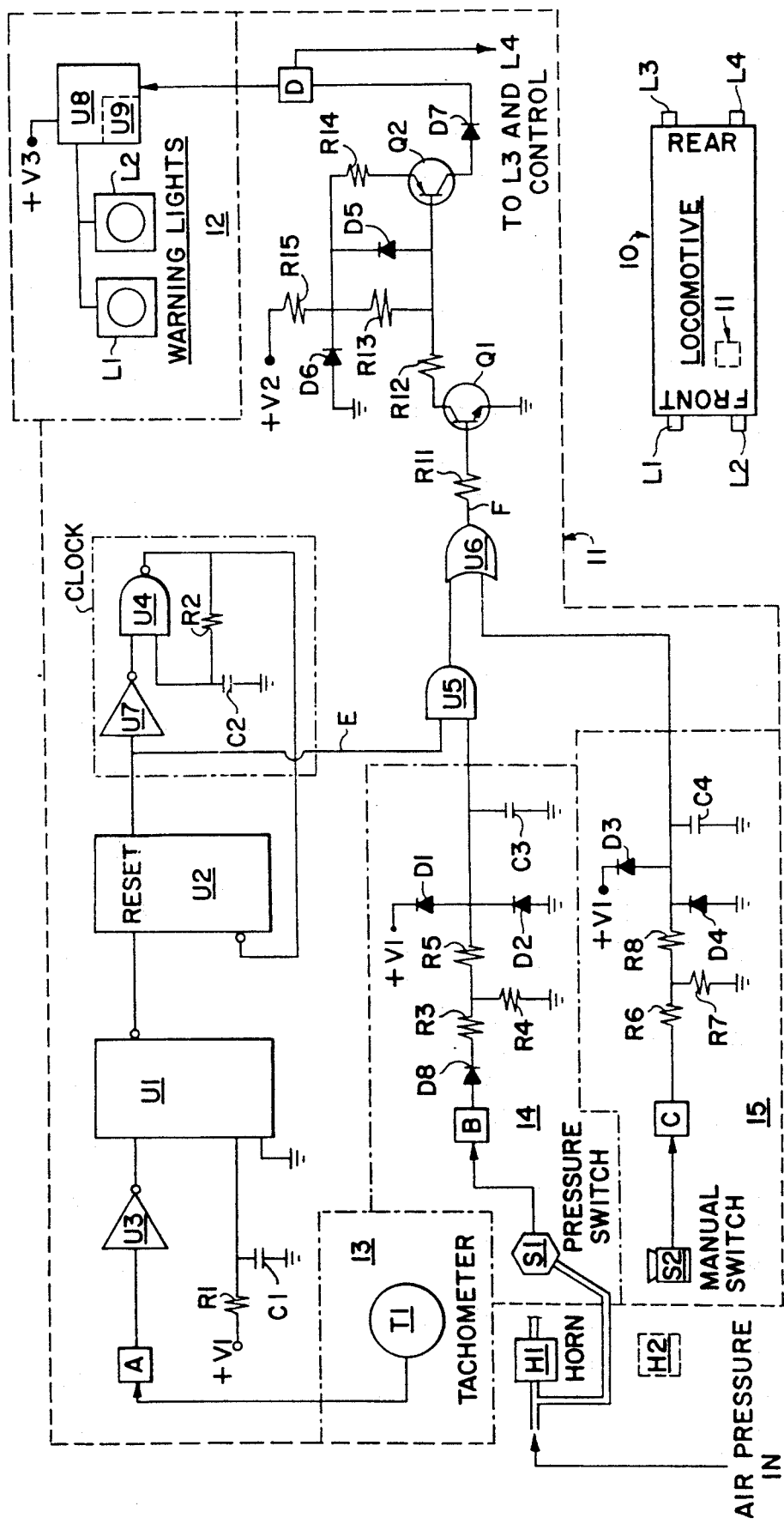
FIG. 1 is a top location diagram of a locomotive illustrating the location of lights used in the visual warning system of the present invention.
FIG. 2 is a simplified schematic diagram of the control electronics system used to control the lights of FIG. 1 and illustrating its connection to the lights and associated lamp control unit.

With respect to the drawings, a top location illustration of a standard locomotive is shown in FIG. 1. The lights L1 and L2 are installed on the front of the locomotive 10 and are aligned approximately 5° from the center line of the locomotive 10. This arrangement increases the effectiveness of the lights L1, L2 by providing better illumination of the approach area of the locomotive 10 and increases the ability of the lights L1, L2 to get the attention of a motorist approaching a train crossing. Many locomotives 10 are designed to operate in either direction and such a vehicle would also include lights L3, L4 mounted on the rear which are also angled outboard by 5°.

With respect now to FIG. 2, a simplified schematic diagram of the visual warning system in the form of a control module 11 and associated input and output circuits is illustrated. Locomotive speed monitoring means 13 includes a radar or axle alternator type locomotive tachometer T1 at terminal A to provide a first output signal having a frequency proportional to the speed of the locomotive 10. This speed input signal is sent to inverter U3 and to retriggerable one-shot multivibrator U1. The inverted output from U1 is (1) a logic "1" when the locomotive 10 is at rest; (2) a logic "0" when the locomotive 10 is travelling above a pre-set speed such that the incoming signal from tachometer T1 has a period shorter than that of U1 with the result that U1 is constantly triggered; and (3) constantly switching from logic "0" to a logic "1" when the speed of the locomotive 10 is greater than zero m.p.h. but less than the pre-set speed, which is preferably about 8 m.p.h.

U1 supplies an output to the RESET line of binary counter U2. The status of the binary counter U2, then, is (1) RESET mode when the locomotive 10 is at rest; (2) COUNTING mode when it is above 8 m.p.h., and (3) being periodically reset when the speed of the locomotive is greater than zero m.p.h. but less than 8 m.p.h. When the counter U2 is held in RESET, its output is logic "0". When U2 is not being held in RESET, that is, it is in the COUNTING mode, the U2 output will first be logic "0" and inverted to logic "1" via inverter U7. U7 and NAND gate U4 operate as a clock with a frequency determined by the values of R2 and C2 as understood in the art. With a logic "1" input to U4, U4 will provide a pulse train to U2 which is counted until a logic "1" is provided to U7 which is inverted to "0" to stop the clocking of U4.

When the locomotive 10 is travelling at a speed of less than 8 m.p.h., U2 is constantly being reset. The time period that is required for U2 to count to a "1" output is selected to be longer than the minimum time period between RESET pulses. Accordingly, the output of U2 is "0". The output of U2 is used as a speed-selective control signal at point "E" for control of the lights L1 and L2.

First circuit means 14 for monitoring the locomotive's own selectively operable audible warning includes switch S1 which is a pressure switch that is activated when air pressure is applied to the locomotive horn H1. A second output signal is then supplied at terminal "B" to signal conditioning circuitry and from there to second circuit means in the form of logic circuitry that includes AND gate U5 and associated circuitry between U5 and terminal "D". If the speed selective signal is a logic "1" (point "E") indicating that the locomotive 10 is at a speed of more than 8 m.p.h., the horn signal at U5 is passed to OR gate U6. The horn signal is blocked at U5 if the locomotive 10 is operating at less than 8 m.p.h.

A manually operable switch circuit means 15 includes a manual switch S2 that is similar to that of S1 and signal conditioning circuitry that provides a logic "1" to U6 when S2 is actuated. Accordingly, the OR gate U6 of the second circuit means will provide an output to Q1 when either (1) the horn H1 is actuated at a speed of 8 m.p.h. or more, or (2) when the manual switch S2 is operated.

Voltage amplifier Q1 provides an interface from low voltage logic to the higher +V2 which, in locomotive application is about 70 VDC and controls Q2 which provides an output from the second circuit means via terminal "D" to the conventional trigger circuitry in strobe unit U8 to operate signal lamps or lights L1 and L2.

In the preferred embodiment third circuit means comprising a, strobe control unit U8 which includes a clocked trigger circuit and a selectable binary counter U9 to provide that lights L1, L2 are illuminated, preferably about thirty two times, when actuated via Q2. This particular approach to providing an actuating HOLD for the lights L1, L2 maintains the lights L1, L2 ON because L1, L2 are stroboscopic lamp assemblies used for high visibility. The lights L1, L2 will be turned OFF after flashing thirty two times as established by U9. The voltage V3 may be equal to +V2 or be some other value based upon the specific lamps used in L1 and L2.

In the illustrated preferred embodiment of the invention, horn H1 is air pressure-operated and S1 is a pressure switch. It is understood that horn H1 could include an electric actuator. In this event S1 can be deleted and the connecting wires to terminal "B" simply connected to the electric circuitry associated with an electric horn H2.

To summarize, the signal at point "E" is a logic "1" when the locomotive 10 is operating at a speed of 8 m.p.h. and is a logic "0" otherwise. The output at point "F" is a logic "1" to operate the lights L1 and L2 ON when (1) the horn H1 is blowing and the locomotive 10 is moving at more than 8 m.p.h. or (2) when the manual switch S2 is operated. The signal at "F" is a logic "0" to not operate the lights L1 and L2 ON when (1) the locomotive 10 is moving at less than 8 m.p.h. or (2) H1 is not being operated regardless of the speed of the locomotive 10.

As understood in the art, the value and type of components used for resistors R1-R15; capacitors C1-C4; transistors Q1, Q2; and diodes D1-D8 are chosen to provide for the desired operation and characteristics of the associated circuits. Terminals A, B, C, D are specifically indicated in light of the system as actually constructed and to illustrate the interface with other circuit components such as switches S1, S2 and horns H1 or H2 as understood in the art.

We claim:

1. A visual warning system for a locomotive having a selectively operable audible warning device, said system comprising a control module adapted for mounting to a locomotive for selective operation of signal lamps in response to selective operation of the audible warning device and at least one signal lamp electrically connected to said control module and selectively operable ON in response to the operation of said control module, said system further including speed monitoring means for determining the speed of a locomotive and providing a first output signal representative of the speed of a locomotive, first circuit means responsive to operation of the audible warning device for providing a second output signal when the warning device is being operated ON, and second circuit means responsive to said first and second output signals for selectively operating said lamp ON by said control module in response to said first and second output signals.

2. In the warning system as defined in claim 1 further including manually operable switch means for selective operation of said lamp ON by operation of said switch means.

3. In the warning system as defined in claim 1 wherein said second circuit means is responsive to said first output signal to prevent said lamp from being operated ON when locomotive speed is below a predetermined speed as established by said second circuit means.

4. In the warning system as defined in claim 3 further including manually operable switch means for selective operation of said lamp ON by operation of said switch means at any speed of a locomotive.

5. In the warning system as defined in claim 1 wherein said second circuit means includes logic circuit means for operating said lamp ON when said second output signal is being provided to said second circuit means representing that said audible warning device is being operated ON and said speed of a locomotive is above a predetermined speed as determined by said second circuit means.

6. In the warning system as defined in claim 1 wherein said second circuit means includes logic circuit means for preventing the operation of said lamp ON in response to said first output signal except when said audible warning device is ON.

7. In the warning system as defined in claim 1 wherein said speed monitoring means includes a tachometer means responsive to locomotive speed.

8. The warning system as defined in claim 7 wherein said tachometer means includes a locomotive radar or axle alternator type tachometer providing a variable frequency output signal.

9. A visual warning system for a locomotive having a selectively operable audible warning device, said system comprising a control module control unit adapted for mounting in a locomotive for selective operation of signal lights ON and OFF and at least one signal light electrically connected to said control module and being selectively operable thereby ON and OFF in response to selective operation of said control module, said system further including speed monitoring means adapted to be mounted on a locomotive for determining the speed of a locomotive and providing a first output signal representative of the speed of a locomotive, said system additionally including first circuit means responsive to the operation of the audible warning device for providing a second output signal representative of said warning device being operated either ON and OFF and second circuit means responsive to said first and second output signals for selectively operating said signal light ON in response to said first and second output signals.

10. In the warning system as defined in claim 9 wherein said control module includes third circuit means for maintaining said signal light ON for a predetermined time period as established by said third circuit means after said signal light has been operated ON by said control module and operating said signal light OFF after said time period.

11. In the warning system as defined in claim 9 wherein said second circuit means is responsive to said first output signal for preventing said light from being operated ON when locomotive speed is below a predetermined speed as established by said second circuit means.

12. In the warning system as defined in claim 9 wherein said second circuit means is responsive to said first output signal to permit operation of said signal light to ON when locomotive speed is above a predetermined speed as determined by said second circuit means.

13. In the warning system as defined in claim 12 wherein said signal light will be operated ON by said second circuit means when locomotive speed is above said predetermined speed and said audible warning device is operated ON.

14. In the warning system as defined in claim 9 wherein said audible warning device includes an air pressure-operated horn, said first circuit means including a pressure switch for providing said second output signal and being selectively actuatable by air pressure to said horn when said warning device is selectively operated ON.

15. In the warning system as defined in claim 9 wherein said audible warning device includes a horn and an electric actuator for operating said horn ON, said first circuit means including sensing circuit means connected to said actuator for providing said second output signal when said horn has been selectively operated ON by said actuator.

16. In the warning system as defined in claim 9 wherein said signal light is a stroboscopic lamp, control module including strobe control circuit means for energizing said stroboscopic lamp ON.

17. In the warning system as defined in claim 16 wherein said strobe control circuit means includes third circuit means for flashing said stroboscopic lamp ON a predetermined number of times as established by said third circuit means.

18. A visual warning system for a locomotive having a selectively operable audible warning device, said system comprising a control module adapted for mounting to a locomotive for selective operation of signal lamps and at least one signal lamp electrically connected to said control module and selectively operable ON in response to the operation of said module, said system further including operating condition monitoring means for sensing an operating condition of a locomotive and providing a first output signal representative of said operating condition of a locomotive, said signal system additionally including first circuit means responsive to operation of the audible warning device for providing a second output signal when the warning device is being operated ON and second circuit means responsive to said first and second output signals for selectively operating said lamp ON in response to said first and second output signal.

19. In the warning system as defined in claim 18 wherein said second circuit means is responsive to said first output signal to prevent said lamp from being operated ON when said operating condition of a locomotive is below a predetermined value as established by said second circuit means.

20. In the warning system as defined in claim 19 wherein said parameter monitoring means includes speed monitoring means for determining the speed of a locomotive, said first output signal being representative of locomotive speed.

21. A visual warning system for a locomotive having an actuatable audible warning device, said system including pressure-sensitive means for sensing the operation of said audible warning device, a control module for mounting on the locomotive, and first means connected to said pressure-sensitive means for triggering said control module whereby said control module is actuated whenever said audible warning device is in operation, the improvement comprising second means connected to said control module for sensing the speed of a locomotive and providing an output signal indicative of the speed, logic circuit means operatively connected to said control module and responsive to said output signal for selectively preventing the actuation of said control module by said first means when the speed of a locomotive is below a predetermined speed as established by said second means, and circuit means for maintaining the actuation of said control module after operation in response to said audible warning device.

* * * * *